US011953173B2

(12) United States Patent
Cramer et al.

(10) Patent No.: US 11,953,173 B2
(45) Date of Patent: Apr. 9, 2024

(54) ILLUMINATION APPARATUS FOR VEHICLES

(71) Applicant: HELLA GmbH & Co. KGaA, Lippstadt (DE)

(72) Inventors: Herbert Cramer, Ruethen (DE); Florian Herold, Bielefeld (DE); Christian Schimon, Lippstadt (DE); Alexander Schwan, Kamen (DE); Dirk Schwemin, Lippstadt (DE)

(73) Assignee: Hella GmbH & CO. KGAA, Lippstadt (DE)

( * ) Notice: Subject to any disclaimer, the term of this patent is extended or adjusted under 35 U.S.C. 154(b) by 0 days.

(21) Appl. No.: 18/137,773

(22) Filed: Apr. 21, 2023

(65) Prior Publication Data

US 2023/0258310 A1 Aug. 17, 2023

Related U.S. Application Data

(63) Continuation of application No. PCT/EP2021/077286, filed on Oct. 4, 2021.

(30) Foreign Application Priority Data

Oct. 23, 2020 (DE) ..................... 10 2020 127 952.3

(51) Int. Cl.
*F21S 41/43* (2018.01)
*F21S 41/143* (2018.01)
(Continued)

(52) U.S. Cl.
CPC ............ *F21S 41/43* (2018.01); *F21S 41/143* (2018.01); *F21S 41/27* (2018.01); *F21S 41/29* (2018.01); *F21S 45/47* (2018.01)

(58) Field of Classification Search
CPC .......... F21S 41/43; F21S 41/27; F21S 41/143; F21S 41/29; F21S 45/47; F21S 41/40
(Continued)

(56) References Cited

U.S. PATENT DOCUMENTS 7,621,658 B2 11/2009 Groetsch et al.
9,593,819 B2 * 3/2017 Sano ....................... F21S 41/43
(Continued)

FOREIGN PATENT DOCUMENTS

DE 102008033416 A1 1/2010
DE 102010023359 A1 4/2011
(Continued)

OTHER PUBLICATIONS

International Search Report dated Nov. 30, 2021 in corresponding application PCT/EP2021/077286.

*Primary Examiner* — Laura K Tso
(74) *Attorney, Agent, or Firm* — Muncy, Geissler, Olds & Lowe, P.C.

(57) ABSTRACT

An illumination apparatus for vehicles having a light source, a support plate for receiving the light source, and an optical unit arranged in front of the light source in the main emission direction to deflect light emitted by the light source onto a roadway in front of the vehicle in accordance with a predetermined light distribution. The light source has a light-emitting surface and a light source frame surrounding the same. The light source is surrounded by a shielding frame with a wall that is raised in the main emission direction and encloses an intermediate space between the light source and the optical unit.

10 Claims, 2 Drawing Sheets

(51) Int. Cl.

| | |
|---|---|
| ***F21S 41/27*** | (2018.01) |
| ***F21S 41/29*** | (2018.01) |
| ***F21S 45/47*** | (2018.01) |

(58) Field of Classification Search
USPC .......................................................... 362/520
See application file for complete search history.

(56) References Cited

U.S. PATENT DOCUMENTS

| | | | | |
|---|---|---|---|---|
| 10,137,821 | B2 | 11/2018 | Inoue et al. | |
| 10,378,733 | B1 | 8/2019 | McLellan | |
| 10,495,276 | B2 * | 12/2019 | Nakao | F21S 41/663 |
| 10,731,816 | B2 | 8/2020 | Pfaff | |
| 2009/0003009 | A1 | 1/2009 | Tessnow et al. | |
| 2011/0122617 | A1 | 5/2011 | Frey et al. | |
| 2011/0222303 | A1 | 9/2011 | Tokida et al. | |
| 2013/0135885 | A1 * | 5/2013 | Anzai | F21S 41/151<br>362/511 |
| 2013/0242587 | A1 | 9/2013 | Hirabayashi et al. | |
| 2016/0320012 | A1 | 11/2016 | Takada et al. | |
| 2017/0153002 | A1 | 6/2017 | Sommerschuh | |
| 2018/0264995 | A1 | 9/2018 | Inoue et al. | |
| 2020/0309342 | A1 | 10/2020 | Monestier et al. | |

FOREIGN PATENT DOCUMENTS

| | | | |
|---|---|---|---|
| DE | 102014220614 | A1 | 4/2015 |
| DE | 102014104503 | A1 | 10/2015 |
| DE | 102014207419 | A1 | 11/2015 |
| DE | 102016206238 | A1 | 10/2017 |
| DE | 112016002700 | T5 | 3/2018 |
| DE | 102017105027 | A1 | 9/2018 |
| DE | 102017105888 | A1 | 9/2018 |
| DE | 202020103656 | U1 | 11/2020 |
| EP | 3376095 | A1 | 9/2018 |
| JP | 2020113419 | A | 7/2020 |
| KR | 1020100006232 | A | 1/2010 |
| WO | WO2006097067 | A1 | 9/2006 |

* cited by examiner

ILLUMINATION APPARATUS FOR VEHICLES

This nonprovisional application is a continuation of International Application No PCT/EP2021/077286, which was filed on Oct. 4, 2021, and which claims priority to German Patent Application No 10 2020 127 952.3, which was filed in Germany on Oct. 23, 2020, and which are both herein incorporated by reference.

BACKGROUND OF THE INVENTION

Field of the Invention

The invention relates to an illumination apparatus for vehicles having a light source, a support plate for receiving the light source, and an optical unit arranged in front of the light source in the main emission direction to deflect light emitted by the light source onto a roadway in front of the vehicle in accordance with a predetermined light distribution, wherein the light source has a light-emitting surface and a light source frame surrounding the same.

Description of the Background Art

An illumination apparatus for vehicles having a light source designed as an LED chip is known from DE 10 2017 105 888 A1. This LED chip has a multiplicity of miniaturized light-emitting elements that can be referred to as pixels. These pixels are each individually controllable so that, in combination with an optical unit associated with the light source, a high-resolution light distribution can be created on a roadway. Since such LED chips are usually arranged on a support plate that also contains additional electronic components, the problem arises that reflections occur in the case of lateral emission of the light, which results in undesirable scattered light. The known illumination apparatus solves this problem by providing an additional lens that deflects the laterally emitted light to the side so that it cannot emerge from the housing of the illumination apparatus as utilized light. It is a disadvantage of the known illumination apparatus that an additional optical component is necessary, which increases costs and the installation space requirement in the axial direction.

An illumination apparatus for vehicles, having a light source that is arranged on a support plate, is known from US 2011/0222303 A1. Arranged in front of the light source in the main emission direction is an optical unit for deflecting the light emitted by the light source in accordance with a predetermined light distribution. The light source has a light-emitting surface on a side facing the optical unit, as well as a light source frame surrounding the same. The light source frame terminates flush with the light-emitting surface in the main emission direction of the light source, and thus cannot prevent laterally emitted light from emerging from the light source.

SUMMARY OF THE INVENTION

The object of the present invention is therefore to improve an illumination apparatus for vehicles such that light emitted by the light source at a relatively great lateral angle is prevented in a simple manner from exiting the illumination apparatus toward the roadway in front of the vehicle as scattered light.

To attain this object, the invention is characterized in that the light source is surrounded by a shielding frame with a wall that is raised in the main emission direction and encloses an intermediate space between the light source and the optical unit.

A shielding frame is provided that encloses the light source with a frame wall such that an intermediate space extending between the light source and the optical unit is covered or shielded such that only the light emitted directly onto the optical unit by the light source exits a housing of the illumination apparatus as utilized light for creating the predetermined light distribution. The shielding frame is made of a light-absorbing material, so the light from the light source that strikes it is absorbed and cannot exit the housing of the illumination apparatus as scattered light. Advantageously, no undesirable reflections of the light emitted by the light source can occur at neighboring electrical components, since the frame wall of the shielding frame is arranged between the light source and the neighboring components located on the support plate.

The shielding frame can be attached to the support plate and/or to a heat sink that is permanently connected to the support plate. A compact assembly on which the optical unit can be placed in the main emission direction is advantageously produced in this way.

The shielding frame can be connected by a fastener to the support plate in a corner region of the same so that no additional installation space is required for fastening the shielding frame.

The frame wall of the shielding frame is designed to follow an edge contour of the light source. In this way, the frame wall completely surrounds the light source and shields the same only as far as is necessary.

The shielding frame may widen in the main emission direction of the light source, wherein a coupling wall is formed on which an optical support carrying the optical unit is mounted in a sealing manner. Advantageously, the shielding frame extends between the support plate and preferably beyond a rear edge of the optical unit while laterally covering or shielding the light source.

A free edge of the coupling wall of the shielding frame can have a greater distance from the support plate than a rear side of the optical unit facing the support plate. Consequently, the coupling wall advantageously circumferentially surrounds a rear edge region of the optical unit, so that an intermediate space between the support plate and the rear side of the optical unit, with the inclusion of the light source, is shielded. As a result of the sealing attachment of the coupling wall to the optical support, an intermediate space between the optical unit and the support plate that is sealed virtually hermetically or in a dustproof manner is created in which the light source is arranged. Undesirable deposits of dust on the light source are reliably avoided as a result.

The shielding frame can have, at least on an inner side thereof, a light-absorbing surface. In particular, the shielding frame can be made of a black or dark-colored plastic material so that a relatively high degree of light absorption is ensured. Consequently, the light striking the shielding frame is absorbed as a rule, and cannot emerge from the housing of the illumination apparatus as undesirable scattered light. The shielding frame preferably is shaped such that the light emitted by the light source strikes the rear side of the optical unit in accordance with a predetermined solid angle range. Consequently, the shielding frame can advantageously define a predetermined solid angle range of the light that is emitted by the light source and used, which improves light output.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
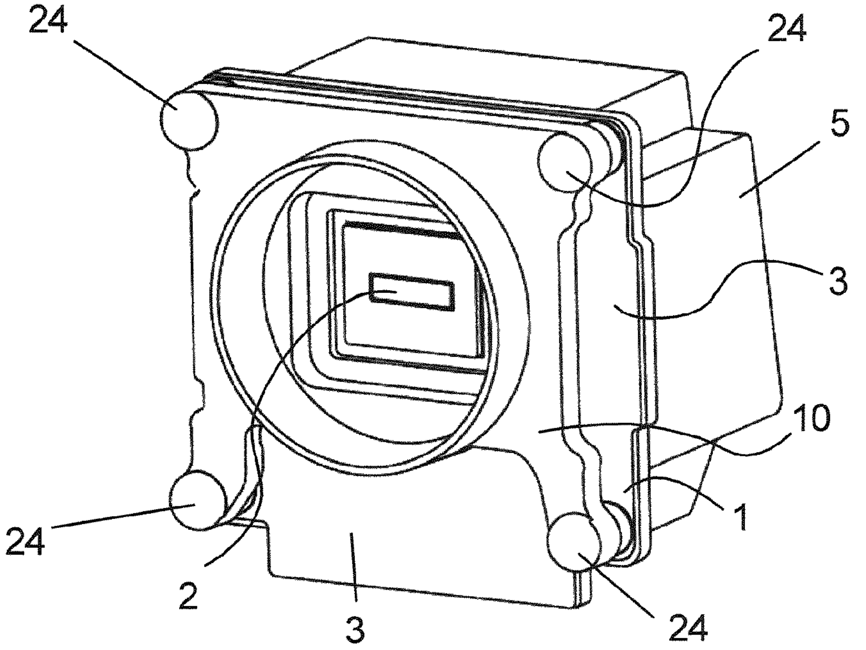
FIG. 1 is a perspective front view of an illumination apparatus, wherein an optical unit of the same has been omitted.
Figure 2:
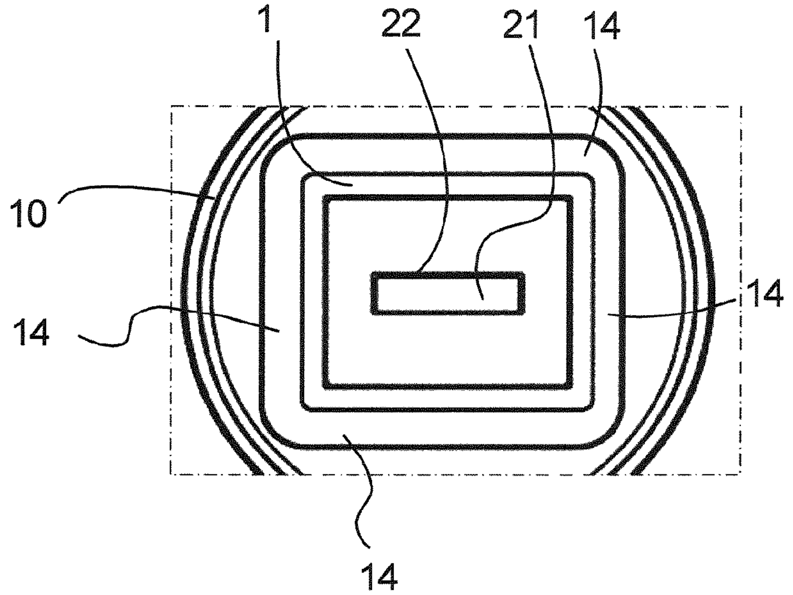
FIG. 2 is a top view of the light source and a frame wall of a shielding frame that surrounds said light source.
Figure 3:
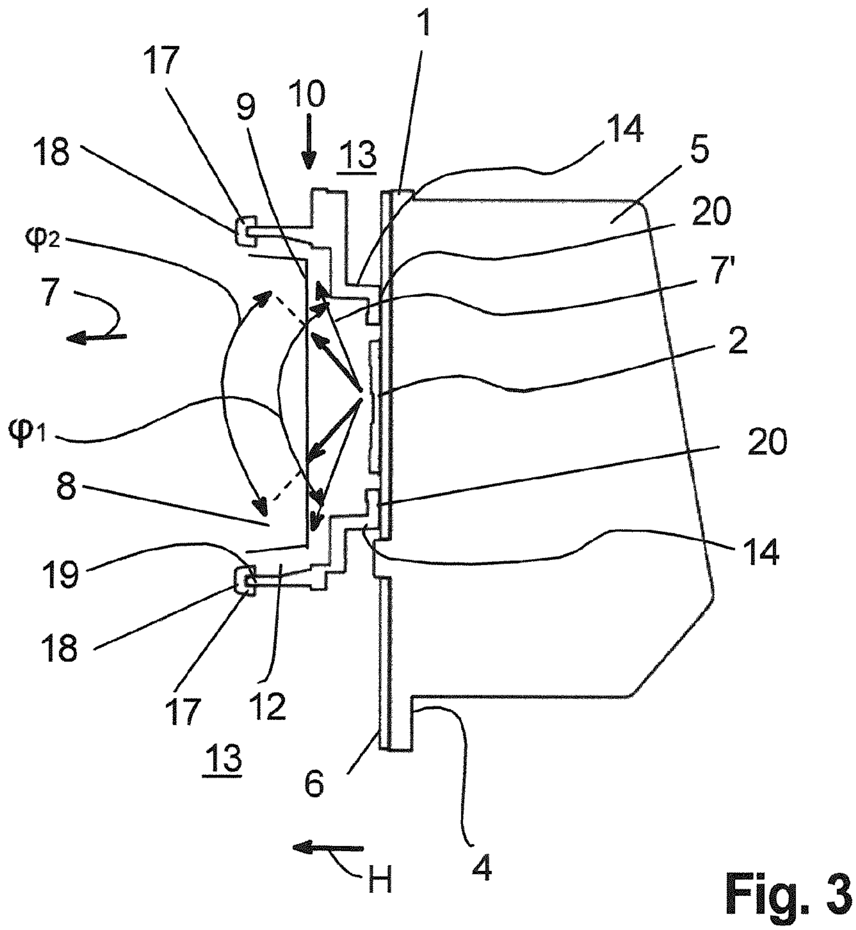
FIG. 3 is a partial vertical section through the illumination apparatus.

An illumination apparatus for vehicles is designed as a high-resolution headlight that includes a light source 2 arranged on a support plate 1. The light source 2 is designed as an LED chip with a multiplicity of individually controllable light-emitting elements that can be regarded as pixels. The support plate 1 is designed as a printed circuit board, preferably as a rigid printed circuit board. In addition to the light source 2, the support plate 1 is populated with additional electronic components 3 that serve to control the light source 2.

Placed on a rear side 4 of the support plate 1 facing away from the light source 2 is a heat sink 5, which serves to cool the illumination apparatus. The heat sink 5 extends flat and directly adjoining the rear side 4 of the support plate 1.

The light source 2 and the electronic components 3 are arranged on a front side 6 of the support plate 1. The light source 2 emits light 7 in the main emission direction H, which strikes an optical unit 8 ahead of the light source 2, which is to say arranged in front of the light source in the main emission direction H. The optical unit 8 is composed of a number of lenses that are not shown. By means of the optical unit 8, the light 7 emitted by the light source 2 is projected in front of the vehicle onto a roadway (not shown) in accordance with the predetermined light distribution.

Figure 4:
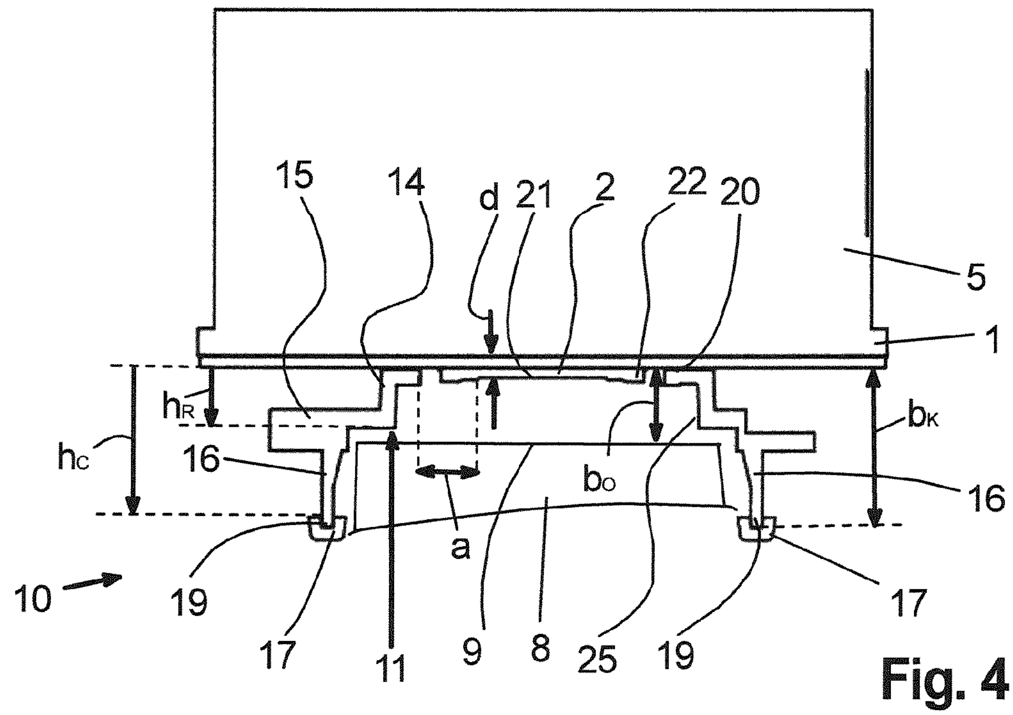
FIG. 4 is a partial horizontal section through the illumination apparatus.

So that the light 7 strikes a rear side 9 of the optical unit 8 facing the light source 2 in an intended solid angle range $\varphi_1$, a shielding frame 10 is provided. The shielding frame 10 delimits or defines the maximum solid angle $\varphi_1$ of the light 7 that strikes the rear side 9 of the optical unit 8. As is evident from FIG. 4, the shielding frame 10 has an intermediate section 11 to which lateral border rays 7' travel. The shielding frame 10 delimits an intermediate space 12 between the support plate 1 and the optical unit 8 in an arrangement including the light source 2, wherein this intermediate space 12 is sealed virtually hermetically and in airtight manner from an exterior space 13. For this purpose, the shielding frame 10 is cup-shaped, wherein it has an offset opening in a central region, Located in this offset opening is the light source 2. The offset opening is formed by a frame wall 14, which has a predetermined height $h_R$. In the region of the intermediate section 11, the frame wall 14 transitions into a base section 15, which is essentially parallel to the support plate 1. The base section 15 serves to widen the shielding frame 10. Extending from the base section 15, on an outer side facing away from the frame wall 14, is a coupling wall 16 which is permanently connected to an edge 17 of an optical support 18 that carries the optical unit 8. In the present exemplary embodiment, a free edge 19 of the coupling wall 16 is held in a sealing manner in an adhesive bed of the edge 17 of the optical support 18.

A free edge 20 of the frame wall 14 is preferably located directly in the vicinity of the support plate 1, preferably at a short distance of, e.g., 0.05 mm from the same, forming a slit, so that the entry of dust particles into the intermediate space 12 is prevented. On account of tolerance variations, the free edge 20 can also rest directly on the support plate 1 or contact the same.

In the present exemplary embodiment, the light source 2 has a light-emitting surface 21 as well as a light source frame 22 that surrounds the light-emitting surface 21. The light source frame 22 is raised relative to the light-emitting surface 21 so that the solid angle q of the light 7" emitted by the light-emitting surface 21 is delimited by a lateral edge of the light source frame 22. In the present exemplary embodiment, the light source frame 22, and not a protrusion of the intermediate section 11 of the shielding frame 10, delimits the maximum solid angle $\varphi_1$ of the emitted light 7.

In the present example, the frame wall 14 extends to the vicinity of the rear side 9 of the optical unit 8.

The frame wall 14 can also extend directly up to the rear side 9 of the optical unit 8 or—especially when the optical unit 8 has a relatively small transverse extent—directly to the lateral edge of the optical unit 8 while contacting the same. In this case, the shielding frame 10 would limit the maximum solid angle $\varphi_1$ of the light beam 7.

The frame wall 14 may have a distance a from the light-emitting surface 21 or from the light source frame 12. No electrical components 3 are arranged on the support plate 1 in this section. The frame wall 14 follows the edge contour of the light source 2, wherein the distance a is preferably kept constant.

A transverse extent 23 of the frame wall 14 is greater than a corresponding transverse extent of the light source 2.

The height $h_R$ of the frame wall 14 can be greater than a thickness d of the light source 2. A height $h_C$ of the shielding frame 10 is greater than a distance $b_O$ of the rear side of the optical unit 8 from the support plate 1.

The shielding frame 10 has protrusions 24 at the corners, where the shielding frame 10 is permanently connected to the support plate 1 and the heat sink 5 by a fastener, preferably through screw connections. In the present exemplary embodiment, the shielding frame 10 has four protrusions 24 so that it is locked in place via four support points. The support plate 1 is thus clamped between the shielding frame 10 and the heat sink 5.

The shielding frame 10 can have, at least on an inner side 25, a light-absorbing surface, which preferably is colored dark or black. For example, the shielding frame 10 can be made of a dark or black-colored plastic material.

The edge 19 of the coupling wall 16 has a greater distance $b_K$ from the support plate 1 than the rear side 9 of the optical unit 8, which has a distance $b_O$ from the support plate 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An illumination apparatus for a vehicle, the illumination apparatus comprising:

a light source;

a support plate, the light source being positioned on a front side of the support plate; and an optical unit arranged in front of the light source in a main emission direction to deflect light emitted by the light source onto a roadway in front of the vehicle in accordance with a predetermined light distribution, wherein the light source has a light-emitting surface and a light source frame surrounding the light-emitting surface, wherein the light source is surrounded by a shielding frame that is raised in a main emission direction and encloses an intermediate space between the light source and the optical unit, wherein the shielding frame includes a frame wall that is arranged at a distance from the light source and extends into a region near or directly up to the optical unit, and wherein the shielding frame widens, at least partially in the main emission direction, from the frame wall into a coupling wall that is connected in a sealing manner to an optical support carrying the optical unit.

2. The illumination apparatus according to claim 1, wherein the frame wall is designed to follow an edge contour of the light source.

3. The illumination apparatus according to claim 1, wherein the shielding frame is attached to the support plate, wherein the frame wall of the shielding frame either directly contacts the front side of the support plate or is spaced apart from the front side of the support plate.

4. The illumination apparatus according to claim 3, wherein the shielding frame is attached to the support plate by a fastener arranged in a corner region of the support plate.

5. The illumination apparatus according to claim 1, wherein the optical unit is held by the optical support, and wherein a free edge of the coupling wall is adhesively connected to the optical support by an adhesive bed.

6. The illumination apparatus according to claim 1, wherein the coupling wall has a larger transverse extent than the frame wall.

7. The illumination apparatus according to claim 1, wherein the shielding frame has a light-absorbing surface at least on an inner side of the shielding frame.

8. The illumination apparatus according to claim 1, wherein the shielding frame is made of a dark-colored plastic material.

9. The illumination apparatus according to claim 1, wherein a free edge of the coupling wall has a greater distance from the support plate than a rear side of the optical unit.

10. The illumination apparatus according to claim 3, further comprising a heat sink that is arranged on a rear side of the support plate facing away from the light source.

* * * * *